UNITED STATES PATENT OFFICE.

RICHARD LIEBOLD, OF BERLIN, GERMANY.

MANUFACTURE OF WATERPROOF AND NON-EXUDING CEMENTS.

No. 847,015.   Specification of Letters Patent.   Patented March 12, 1907.

Application filed February 5, 1906. Serial No. 299,631.

*To all whom it may concern:*

Be it known that I, RICHARD LIEBOLD, merchant, a subject of the Grand Duke of Saxe-Weimar, residing at Berlin, Germany, have invented certain new and useful Improvements in the Manufacture of Waterproof and Non-Exuding Cements, of which the following is a specification.

My invention relates to improvements in the manufacture of waterproof and non-exuding cements.

In order to accelerate or retard the setting process of cement and to cause it to retain for a longer time the water necessary for its hardening, soda, potash, or gypsum have already been added to the ground Portland cement. Similarly, it has been attempted to render the cement waterproof and to prevent the sweating of the stone by impregnating the cement blocks with paraffin-wax, colophony, or stearin. These processes have been hitherto executed in such a manner that the cement clinkers are impregnated in a cold condition as they are lying in the clinker-shed or in any other place. The drying of the cement clinkers in a cold condition could only be effected in such a manner that the cement clinkers were spread out in very thin layers, whereby the water contained in the impregnation mass could more quickly evaporate, for if the impregnated cement clinkers were not completely dry at the subsequent grinding process, which naturally required a longer storage, a filling up of the sieves was to be apprehended during the grinding process. A premature setting of the cement also very easily occurred. This mode of manufacture therefore required an essential extension or usage of the clinker-sheds, respectively, &c., whereby a considerable increase in the price of manufacture was caused, owing to the payment of interest on the plant; apart from the fact that the quality of the final product might suffer damage by the use of incompletely-dried impregnated cement clinkers. In order to avoid these drawbacks and also bring about a saving by storage of the cement clinkers in layers above each other, whereby an essential reduction of the amount of space hitherto required in the clinker-sheds and similar arrangements for storage could be attained, the cement clinkers are impregnated in a warm condition on the basis of the present invention. The water used for diluting the impregnation mass is then evaporated in the shortest manner by the heat still contained in the cement clinkers, in consequence of which the same can be ground after a correspondingly brief period of time and a premature setting of the cement is prevented.

The object of the process according to this invention is therefore to bring about a quick evaporation of the water contained in the impregnation mass for the purpose of making a quick grinding of the cement clinkers possible, as well as to save the great costs for premises required for storage of the cement clinkers, at the same time preserving the good setting quality of the cement.

From what has been hereinbefore stated it will be obvious that my method consists, broadly, in impregnating cement materials while in a warm condition with a waterproofing and anti-exuding mass. Such mass is generally a soap mass, and this soap mass may consist of a mixture of two hundred and forty-five grams stearin, ten grams of potash, and twelve grams of colophony dissolved in three-fourths liters boiling water. This mixture is sufficient for the treatment of one hundred kilograms of cement clinkers, or the impregnating mass may be composed of three hundred grams of Japanese wax and twenty grams of caustic potash dissolved in three-fourths liters boiling water, the latter mixture being sufficient for the impregnation of one hundred kilograms of clinkers. The ingredients set forth may be slightly modified within certain limits.

In claiming my method I employ the designation "anti-exuding," this being a simple way of defining one of the characteristics of the impregnating mass or that particular characteristic thereof which protects the cement material against exudation.

The ground cement possessing the qualities of complete impermeability and non-exudation is thereupon quite ready for use, and the same may be employed even in small quantities with plaster and concrete without requiring any further treatment for insuring impermeability, such as the addition of asphalt, coatings, &c.

Having now particularly described the nature of my invention, what I claim is—

1. A method consisting in impregnating cement material while in a warm condition with a waterproofing and anti-exuding mass.

2. A method consisting in impregnating cement material while in a warm condition with a waterproofing and anti-exuding soap mass.

3. A method consisting in impregnating cement material while in a warm condition with fatty acids in the form of soap.

4. A method consisting in impregnating cement material while in a warm condition with a mixture composed of stearic acid and potash.

5. A method consisting in impregnating cement material while in a warm condition with a mixture composed of stearic acid, potash and colophony.

6. A method consisting in impregnating cement clinkers while in a warm condition with a waterproofing and anti-exuding mass.

In testimony whereof I have hereunto set my hand in presence of two subscribing witnesses.

RICHARD LIEBOLD.

Witnesses:
  HENRY HASPER,
  WOLDEMAR HAUPT.